United States Patent [19]

Schroeder

[11] Patent Number: 5,472,495

[45] Date of Patent: Dec. 5, 1995

[54] WARPAGE-FREE PIGMENTING OF MACROMOLECULAR ORGANIC MATERIALS

[75] Inventor: Joerg Schroeder, Weinheim, Germany

[73] Assignee: BASF Aktiengesellschaft, Ludwigshafen, Germany

[21] Appl. No.: 221,741

[22] Filed: Mar. 22, 1994

[30] Foreign Application Priority Data

Apr. 22, 1993 [DE] Germany .......................... 43 13 090.9

[51] Int. Cl.$^6$ .................................................. C08K 5/00
[52] U.S. Cl. .......................... 106/493; 106/400; 106/401; 106/499
[58] Field of Search .................................. 106/493, 499, 106/400, 401

[56] References Cited

U.S. PATENT DOCUMENTS 4,478,643  10/1984  Kuwahara et al.
5,074,918  12/1991  Babler ................................. 106/493
5,266,616  11/1993  Wolfe .................................... 524/94
5,271,759  12/1993  Wooden et al. ..................... 106/411
5,274,010  12/1993  Bugnon et al. ...................... 523/206
5,401,780   3/1993  Bugnon et al. ...................... 523/206

FOREIGN PATENT DOCUMENTS 0254424  1/1988  European Pat. Off. ..

OTHER PUBLICATIONS

Database WPI, Derwent Publications Ltd., AN 82–96326E, JP-A-57 159 856, Oct. 2, 1982.

Primary Examiner—Mark L. Bell
Assistant Examiner—Scott L. Hertzog
Attorney, Agent, or Firm—Oblon, Spivak, McClelland, Maier, & Neustadt

[57] ABSTRACT

A process for the warpage-free pigmenting of macromolecular organic materials comprises using organic pigments which have been exposed to a low temperature plasma.

4 Claims, No Drawings

WARPAGE-FREE PIGMENTING OF MACROMOLECULAR ORGANIC MATERIALS

The present invention relates to a novel process for the warpage-free pigmenting of macromolecular organic materials.

The coloring of macromolecular organic materials, particularly polyolefins, with organic pigments frequently gives rise to warpage phenomena. They show themselves in changed mechanical properties of the pigmented material. For example, high-volume injection moldings, such as bottle crates made of high density polyethylene (HDPE), will frequently come to exhibit deformation and shrinkage accompanied by cracking. In the case of bottle crates, for example, the consequence can also be that they are no longer stackable, generally making them unusable. In addition to these long-term defects the material will frequently also undergo an embrittlement process after only a short period of use, leading for example in the case of bottle crates to insufficient rip-out resistance in the carrier grip region.

These phenomena are due to the presence of the organic pigment, which, during the solidification of the polymer melt, acts as a nucleating center, interferes with the crystallization of the pure polymer, and leads to the formation in the polymer of a spherulite structure which is prone to warp.

To counteract this effect there have already been proposed various methods whereby, inter alia, the surface of the pigment is coated, for example with polymers, or mixtures of the pigment with a suitable pigment derivative or some other additive are used. However, these methods can frequently only be applied to certain classes of pigments and even then do not always give satisfactory It is an object of the present invention to provide a verywidely applicable process for the warpage-free pigmenting of polymeric material with organic pigments.

We have found that this object is achieved by a process for the warpage-free pigmenting of macromolecular organic materials which comprises using organic pigments which have been exposed to a low temperature plasma.

The plasma treatment alters the surface of the organic pigments in such a way that they will no longer have an interfering effect on the crystallization of the polymer and warpage phenomena in the ready-produced pigmented product can be avoided.

This surface treatment of the pigment with a low temperature plasma can be carried out in a conventional manner and as described for example in DE-A-33 21 044 (U.S. No. 4,478,643) and EP-B-254 424.

Since the use of a low temperature plasma involves ambient temperatures from generally 20° to 70° C., preferably from 20° to 50° C., it is generally possible to subject even the less thermally stable organic pigments to this treatment without thermal decomposition.

A low temperature plasma can be generated by radio frequency, microwaves, direct current or alternating current.

The pigmenting process of the invention preferably uses those organic pigments which have been treated with a low temperature plasma generated by radio frequency radiation (usually 13.56 MHz) or particularly by microwave radiation (usually 2.45 GHz).

If a 13.56 MHz source is used, the resulting plasma contains a high proportion of ionized gas particles with a broad energy distribution at a high level, while if a 2.45 GHz source with afterglow facility is used only a low proportion of ionized particles reaches the sample and there are preferably nonionic, partly free-radical excitation states of the gas particles with a narrower energy distribution at a lower energy level prevailing at the pigment sample.

A particular advantage is the use of microwave plasma downstream afterglow installations in which the plasma is generated spatially separated from the pigment powder to be treated. This is particularly gentle on the pigment, since damage to the pigment through UV light and electromagnetic radiation in general and hence also an increased thermal stress is avoided.

Suitable for producing the plasma for the purposes of the present invention are the known reactive and non-reactive (excitation) gases used for this purpose; examples are air, oxygen, water vapor, ammonia, sulfur dioxide, carbon dioxide, carbon tetrafluoride, nitrogen (can act not only as excitation gas but also as reactive gas), helium and argon. The gases can be used alone or in the form of mixtures. The excitation gases are preferably used as mixtures with reactive gases. Generally, the volume ratio of excitation gas to reactive gas is from 20:1 to 1:1, preferably from 10:1 to 3:1.

It is customary to use a preferred gas pressure from about 0.1 to 10 mbar, but it is also possible to use a pressure from 0.01 to 50 mbar. The flow rate is in general from 0.5 to 250 standard ml/min. The sample size has to be taken into account; the larger the sample, the higher the gas requirements.

Preferably the pigment particles being subjected to the treatment are kept in agitation to ensure uniform treatment.

The treatment time finally depends on the nature and the amount of the pigment, on the nature, the pressure and the flow rate of the plasma gas, and on the plasma power. It is advantageous for a total reactive gas supply from about 100 to 1000 μmol/m$^2$ of pigment surface area to be present during the treatment time, assuming an efficiency from 0.1 to 1%. Customary treatment times for a pigment sample from 10 to 30 g are generally from 2 to 8, preferably 4 to 6, h.

Suitable organic pigments for the process of the invention are all organic pigments customarily used for pigmenting macromolecular organic materials. The following pigments are mentioned by way of example:

Monoazo pigments:
C.I. Pigment Brown 25; C.I. Pigment Orange 5, 36, 67; C.I. Pigment Red 3, 48:4, 52:2, 251, 112, 170; C.I. Pigment Yellow 1, 3, 73; 74, 65, 97, 151, 154;

Disazo pigments:
C.I. Pigment Red 144, 166; C.I. Pigment Yellow 12, 17, 83, 113;

Anthraquinone pigments:
C.I. Pigment Yellow 147; C.I. Pigment Red 177;

Anthrapyrimidine pigments:
C.I. Pigment Yellow 108;

Quinacridone pigments:
C.I. Pigment Red 122, 202, 207; C.I. Pigment Violet 19;

Quinophthalone pigments:
C.I. Pigment Yellow 138;

Diketopyrrolopyrrole pigments:
C.I. Pigment Red 254;

Dioxazine pigments:
C.I. Pigment Violet 23, 37;

Flavanthrone pigments:
C.I. Pigment Yellow 24;

Indanthrone pigments:
C.I. Pigment Blue 60, 64;

Isoindoline pigments:
C.I. Pigment Orange 69; C.I. Pigment Red 260; C.I. Pigment Yellow 139;

Isoindolinone pigments:
C.I. Pigment Orange 61; C.I. Pigment Red 257; C.I. Pigment Yellow 109, 110, 173;
Isoviolanthrone pigments:
C.I. Pigment Violet 31;
Perinone pigments:
C.I. Pigment Orange 43; C.I. Pigment Red 194;
Perylene pigments:
C.I. Pigment Black 31; C.I. Pigment Red 123, 149, 178, 179, 190, 224 5 C.I. Pigment Violet 29;
Phthalocyanine pigments:
C.I. Pigment Blue 15 and 16; C.I. Pigment Green 7 and 36;
Pyranthrone pigments:
C.I. Pigment Orange 51; C.I. Pigment Red 216;
Thioindigo pigments:
C.I. Pigment Red 88 and 181;
Triphenylmethane pigments:
C.I. Pigment Blue 61, 62;
Metal complexes:
C.I. Pigment Red 48:2, 52:2.

Preferably the process of the invention is used for pigmenting polyolefins, particularly polypropylene and very particularly polyethylene and HDPE.

The process of the invention is very advantageous in that virtually all organic pigments, including in particular those which usually interfere with the crystallization, can satisfactorily be used for pigmenting macromolecular organic materials, producing warpage-free articles.

EXAMPLES

To assess the heterogeneous nucleation, which correlates with warpage, the crystallization temperatures of cooling, melted, pigmented and non-pigmented HDPE samples were determined by differential scanning calorimetry using the DSC thermal analyzer 9900 from DuPont. The higher the crystallization temperature $T_c$ of a pigmented sample relative to that of a non-pigmented sample, the higher the nucleation activity and hence the tendency to warp.

To produce the test specimens, in each case 0.2% by weight of pigment was powdered onto a granular HDPE (Lupolen®6031). This mixture was then homogenized at from 200° to 240° C. via a twin-screw extruder and made into a colored granular material from which, at 260° C., injection moldings were produced in the check card format (60 mm ×45 mm ×2 mm).

The crystallization temperatures were measured in the cooling phase using a cooling rate of 10°/min on an original sample weight of 6.5 mg (parts of the check cards). Pure HDPE produces in this measurement a crystallization temperature $T_c$ at the peak of the DSC curve of 17.2°±0.5° C. The onset of crystallization is at 122° C.

EXAMPLE 1

10 g of C.I. Pigment Red 178 in powder form were treated with a low temperature plasma from an MAL-1200-X plasma generator from Plasonic using a DSA-1200 downstream afterglow source, a microwave frequency of 2.45 GHz to produce an 800 W plasma under a pressure of 0.3 mbar in a v/v 1:7 oxygen/argon stream at a flow rate of 90 standard ml/min. The treatment time was 6 h.

An HDPE sample colored with the pigment thus treated showed a crystallization temperature $T_c$ of 117.7°±0.2° C. at the peak and a crystallization onset of 122° C.

The crystallization temperature $T_c$ of a comparative sample colored with untreated pigment was 118.8°±0.2° C. at the peak with the crystallization onset being at 123° C. In this case the warpage tendency is distinctly increased.

In addition, the comparative sample showed a distinctly larger number of small spherulites compared with the few, larger spherulites of the sample according to the invention.

EXAMPLE 2

Example I was repeated using a v/v 1:4 ammonia/argon streamat a flow rate of 40 standard ml/min. An HDPE sample colored with treatment pigment showed a crystallization temperature $T_c$ of 118.0°±0.2° C. at the peak and a crystallization onset of 122° C.

We claim:

1. A process for producing warpage-free articles derived from solid polyolefins containing organic pigments therein which comprises exposing the organic pigments to a low temperature plasma, adding the exposed pigment to a solid polyolefin, and forming the material into an article by injection molding.

2. A process as claimed in claim 1, wherein the low temperature plasma is generated by radio frequency or microwave radiation.

3. A process as claimed in claim 1, wherein the polyolefin is selected from the group consisting of polyethylenes and polypropylenes.

4. A process as claimed in claim 1, wherein the polyolefin is high density polyethylene.

* * * * *